United States Patent [19]

Feil

[11] 4,289,566
[45] Sep. 15, 1981

[54] DEVICE FOR HEAT-SEALING AND/OR CUTTING OF THIN FOILS OF SYNTHETIC MATERIALS

[75] Inventor: Rolf Feil, Wasserburg, Fed. Rep. of Germany

[73] Assignee: Bosch Siemens Hausgerate GmbH, Stuttgart, Fed. Rep. of Germany

[21] Appl. No.: 178,748

[22] Filed: Aug. 18, 1980

Related U.S. Application Data

[63] Continuation-in-part of Ser. No. 40,439, May 18, 1979, abandoned.

[30] Foreign Application Priority Data

May 20, 1978 [DE] Fed. Rep. of Germany ....... 7815239

[51] Int. Cl.$^3$ .......................................... B29C 27/06
[52] U.S. Cl. .................. 156/515; 156/583.1; 156/583.8; 156/583.9
[58] Field of Search .................. 156/515, 583.1, 583.6, 156/583.7, 583.8, 583.9

[56] References Cited

U.S. PATENT DOCUMENTS

| | | | |
|---|---|---|---|
| 3,331,726 | 7/1967 | McGinley | 156/583.1 |
| 3,334,004 | 8/1967 | Faust | 156/583.1 |
| 3,624,349 | 11/1971 | Mayer | 219/243 |
| 3,753,829 | 8/1973 | Freeman | 156/515 |
| 3,840,722 | 10/1974 | Mayer | 219/243 |
| 3,986,921 | 10/1976 | Putman | 156/583.1 |
| 4,031,815 | 6/1977 | Verbeke | 156/515 |
| 4,082,941 | 4/1978 | Sukow et al. | 156/515 |

Primary Examiner—Caleb Weston
Attorney, Agent, or Firm—Herbert L. Lerner

[57] ABSTRACT

Device for heat-sealing or cutting thin foil of synthetic material between two dies which are linked to each other and can be pressed together against a restoring force including:

(a) a table-like support having a recess in the underside of the support parallel to the front edge of the support, (b) a spring disposed in the recess, (c) a base strip movable in and out of the recess, the strip movable into the recess upon the application of pressure to press the two dies together, and the strip movable out of the recess upon the release of the pressure by the spring as the restoring force, (d) the table-like support having a pivotable edge on the underside of the support parallel to and to the rear of the base strip to permit the support to pivot on the edge when the base strip is moved into the recess, (e) one die fixed to the top surface of the table-like support, (f) another die disposed above the fixed die movable to press against the fixed die, the movable die having the form of a U-shaped yoke with the legs of the yoke fixedly attached to the yoke and movable therewith, (g) transmission members including two-armed levers which are hinged at one end at the sides of the base strip and at the legs of the U-shaped yoke at the other end, and the levers at an intermediate point between the points of hinging are pivotally fixed to the support, whereby pressing down on the front of the support causes the base strip to move into the recess making the two-armed levers pivot around the intermediate point thereby effecting lowering of the yoke.

4 Claims, 6 Drawing Figures

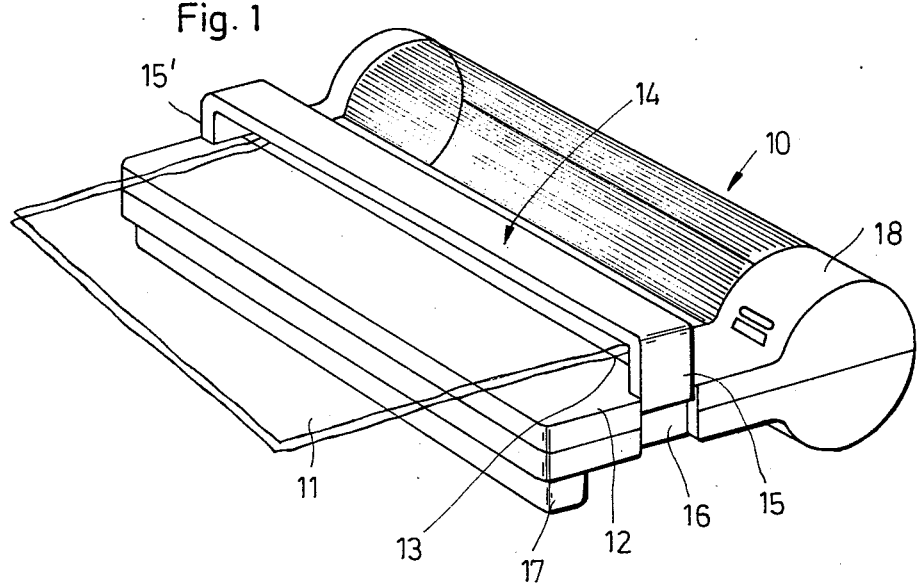
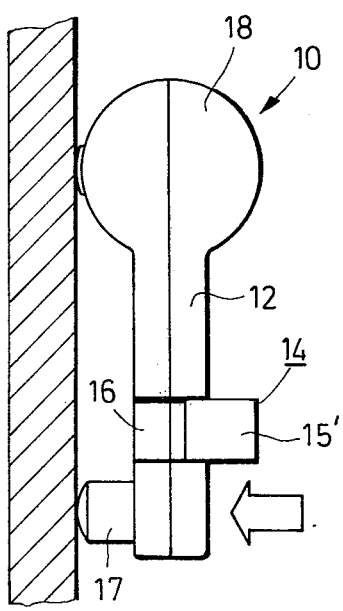
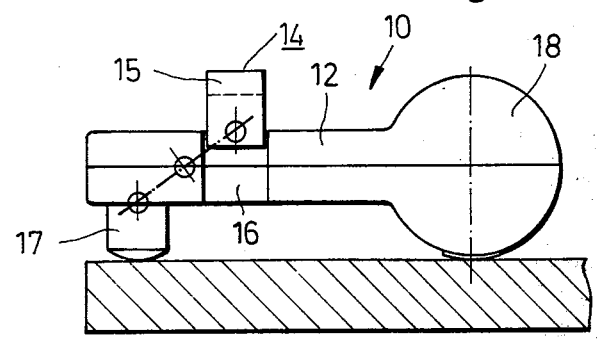
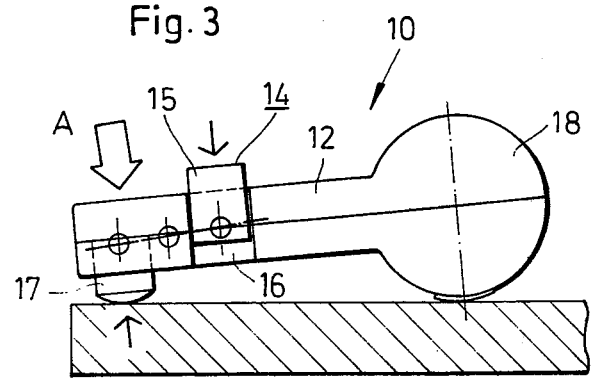

DEVICE FOR HEAT-SEALING AND/OR CUTTING OF THIN FOILS OF SYNTHETIC MATERIALS

This application is a continuation-in-part of application Ser. No. 040,439, filed May 18, 1979, now abandoned.

FIELD OF THE INVENTION

The invention relates to a device for heat-sealing and/or cutting (heat-separating) thin foils of synthetic material between two fusing dies which are linked to each other and can be pressed together against a restoring force. One of the dies is fixed on a table-like support surface while the other is capable of pressing automatically against the fixed fusing die under the effect of pressure exerted on the support surface by means of interposed transmission members.

DESCRIPTION OF THE PRIOR ART

In one known device of the type mentioned, there is linked below a rectangular table supporting the fixed fusing die, a rectangular switching plate with its axis extending in the center between its two long sides. It thus forms a two-armed lever, one end of which rests on the positioning surface of the device, while its other end acts upon a two-armed lever mounted to the movable fusing die. In this manner, the movable fusing die, hinged to the table near its rear edge, is swung toward the table and thereby transferred into the fusing position when the table is pushed down.

However, the reduction ratios resulting from the lever linkage in this manner are very unfavorable, so that satisfactory contact pressure of the fusing dies can be obtained only with unduly high pressure on the support surface. The force required to operate the known device is further increased due to the fact that considerable friction forces are active here in the lever linkage. Due to these disadvantages, the known design was unable to gain acceptance on the market, despite the fact that the fusing dies close automatically by the exertion of pressure on the table and in this respect offered considerable operating advantages over other designs.

In another known device with fusing dies closing automatically under the effect of pressure exerted on the support surface, the table serving as the support surface is divided into a fixed and a movable section. In this case, the movable fusing die, designed in the form of a yoke, is connected to the movable section of the table which acts as a rocker, so that when the movable section of the table is pushed down, the movable fusing die can be pressed, without the exertion of much force, against the fusing die mounted to the fixed part of the support surface.

When the rocker-like movable section of this known device is pushed down, a step comes about at the transition to the fixed section of the table. This step has the effect of causing the plastic foils inserted between the fusing dies to be unintentionally pulled out of the closing fusing dies when the movable section is depressed.

Therefore, the sealing seam cannot be placed very accurately with this device. In addition, the danger exists in this known device that, at the instant of sealing, the plastic foil is subjected to tensile forces due to the step formation at the point of separation. These tensile forces result in a messy sealing seam. Under unfavorable circumstances, tearing of the foil material in the plasticized area next to the sealing seam may also then occur.

SUMMARY OF THE INVENTION

It is an object of the invention to provide a device for heat sealing or cutting thin foils of synthetic material by means of two fusing dies closing automatically upon the exertion of pressure on the support surface which is simple in construction and operation and eliminates the disadvantages occurring in the known devices as described above.

With the foregoing and other objects in view, there is provided in accordance with the invention, a device for heat-sealing or cutting thin foil of synthetic material between two dies which are linked to each other and can be pressed together against a restoring force comprising:
(a) a table-like support having a recess in the underside of the support parallel to the front edge of the support,
(b) a spring disposed in the recess,
(c) a base strip movable in and out of the recess, the strip movable into the recess upon the application of pressure to press the two dies together, and the strip movable out of the recess upon the release of the pressure by the spring as the restoring force,
(d) the table-like support having a pivotable edge on the underside of the support parallel to and to the rear of the base strip to permit the support to pivot on the edge when the base strip is moved into the recess,
(e) one die fixed to the top surface of the table-like support,
(f) another die disposed above the fixed die movable to press against the fixed die, the movable die having the form of a U-shaped yoke with the legs of the yoke fixedly attached to the yoke and movable therewith,
(g) transmission members including two-armed levers which are hinged at one end at the sides of the base strip and at the legs of the U-shaped yoke at the other end, and the levers at an intermediate point between the points of hinging are pivotally fixed to the support, whereby pressing down on the front of the support causes the base strip to move into the recess making the two-armed levers pivot around the intermediate points thereby effecting lowering of the yoke.

Other features which are considered as characteristic for the invention are set forth in the appended claims.

Although the invention is illustrated and described herein as embodied in a device for heat-sealing and/or cutting of thin foils of synthetic materials, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 is a perspective view of a foil sealing device with a support surface designed as a table and fusing dies which close automatically when pressure is applied to the support surface, in accordance with the invention;

FIG. 2 is a side view of the foil sealing device according to FIG. 1;

FIG. 3 shows the foil sealing device according to FIG. 2 with fusing dies closed by downward pressure on the support surface;

FIG. 4 is the foil sealing device wall-mounted in a vertical arrangement.

DETAILED DESCRIPTION OF THE INVENTION

Figure 5:
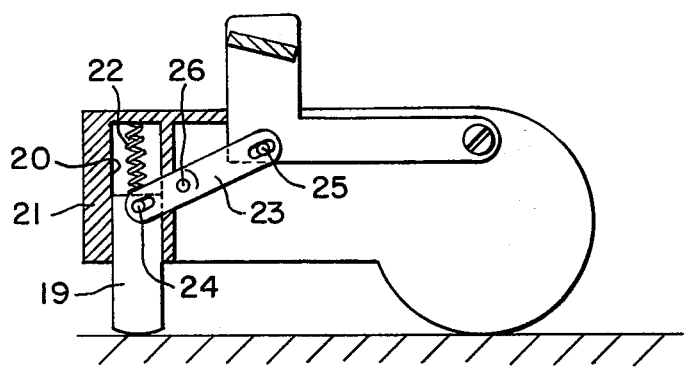
FIG. 5 diagrammatically illustrates a side view of a foil sealing device partially cut away to show the base strip with well-like guiding means for accommodating it, and a spring element as a restoring force, as well as transmission members which engage the legs of the U-shaped yoke and which transmission members cause the movable die to press automatically against the fixed die upon pressure exerted on the support surface.

In accordance with the present invention, the transmission members engage the legs of the movable fusing die designed as a U-shaped yoke. Due to this design, automatic contact pressure of the movable fusing die merely by the exertion of pressure on the support surface can be obtained in a particularly simple manner without having to tolerate the disadvantages occurring in the known designs.

In an advantageous embodiment of the invention, a particularly simple means for effecting the invention is achieved by the provision that the transmission members are designed as a pair of levers, one end of which engages the legs of the U-shaped yoke while its other end is connected to a base strip which serves as support for the support surface and is movable relative to the latter.

Other advantageous features of the invention, characterized in the claims, are explained in the following description by way of an embodiment example in the form of a foil sealing device for household purposes as shown simplified in the attached drawings.

A foil sealing device 10, equipped with the features according to the invention for heat-sealing or cutting (heat-separating) thin foils 11 of synthetic material, is equipped with a table 12 as a support surface and has by and large a rectangular outline. Roughly in the center of the table 12 and in the longitudinal direction thereof runs a strip-shaped heating element 13 provided in the usual manner with a coating of highly heat-resistant elastic material, thus forming the fixed fusing die of the foil sealing device. Heating elements for this purpose are known and described in the art as shown by U.S. Pat. Nos. 3,624,349 and 3,840,722 and particularly heating element 15 of FIG. 2 of the last mentioned patent. Disposed above this fixed sealing die 13 is a U-shaped yoke 14 as the movable sealing die, whose downward-pointing legs 15 and 15' are guided in ways 16 disposed in the narrow faces of the table 12. Below one of the long sides of the table 12, near its outer edge, runs a base strip 17 which can be pushed into a well-like depression, not shown, in the underside of the table 12 against the force of spring elements, likewise not shown. On the long side of the table 12 opposite the base strip 17 is disposed a drum-like container 18, which accommodates a roll of the plastic foil 11 and is of a diameter considerably larger than the thickness of the table 12, extending downward about by the dimension of the base strip 17 under no-load. The drum-like container is cylindrical and its bottom at the area of contact with the supporting surface beneath it is a straight line or edge about which the table 12 pivots when its front end is pushed down. Such pivoting edges can be formed by other means than a cylinder, as for example a triangular member.

As symbolically shown in FIGS. 2 and 3 by the dash-dotted line and appropriate linkage points only, transmission members capable of pressing the movable sealing die 14 against the fixed sealing die running across the table 12 when a force according to the arrow "A" shown in FIG. 3 acts upon the table 12 serving as a support surface. The transmission members engage the legs 15 and 15', respectively, of the yoke 14 representing the movable sealing die, which legs 15 and 15' are guided in the slot-like ways 16 in the narrow faces of the table 12.

Transmission members in the simplest form can be considered as two-armed levers. However, transmission members may be a suitable linkage of several levers where individual levers act upon each other in positive engagement through tooth segments and the like. Also, as to the system shown and described, any other suitable mode of transmission of known kind, such as a hydraulic power transmission, may be employed.

In operation, if two thin plastic foils 11 lying on top of each other are to be joined by heat sealing, they are either pulled off the roll in the container 18 and pulled through the initially open sealing dies to the required length, or they are introduced between the open sealing dies from the long side of the table 12 associated with the base strip 17. The edges of the plastic foil 11 associated with the two narrow sides are gripped for this purpose on both sides in the vicinity of the sealing seam to be made between thumb and index finger of the person operating the device, who smoothes out the plastic foil 11 in the area of the fusing dies by a slight pull outward. Without letting the edge of the foil go, the person operating the device now applies force in the direction of the arrow "A" shown in FIG. 3 on the edge area of table 12 located above the base strip 17. In this process, the spring elements (not shown) which act upon the base strip 17, yield so that the base strip 17 penetrates more deeply in to the well-like depression in the underside of table 12. The relative motion thus generated between the base strip 17 and the table 12 causes the yoke 14 to be lowered onto the table top 12 due to the action of the transmission members which engage the base strip 17 on the one hand and the legs 15, 15', respectively, of the yoke 14 on the other hand. Thus, the device is inclined downward about the supply container, which rolls in the manner shown in FIG. 3, while the fusing dies close at the same time. The contact pressure of the fusing dies depends on the force exerted on the table top and on the reduction ratio of the transmission members.

Upon the conclusion of the sealing operation, controlled in a known manner as a function of either time or temperature, and with decreasing application of pressure on the table 12, the spring elements acting upon the base strip 17 cause the table 12 to rise up again, thereby opening the fusing dies for the next sealing operation.

Figure 6:
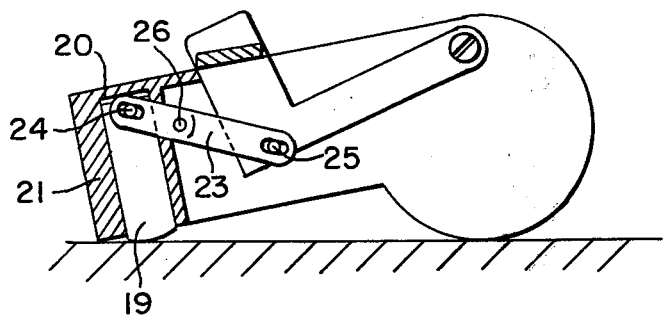
FIG. 6 shows the foil sealing device according to FIG. 5 with fusing dies closed by downward pressure on the support surface.

Referring to FIGS. 5 and 6, the base strip 19 extends over the whole width of the device and is supported in a suitable recess 20 in the underside of the table 21. This recess 20 runs parallel to the front edge of the table 21. Spring 22 in recess 20 is the restoring force when table 21 is pressed down. FIGS. 5 and 6 also show more details with respect to the transfer links. In the shown embodiment the transfer member is a two-armed lever 23, which is hinged at 24 at the sides of the base strip 19, and at 25 at the legs of the U-shaped yoke. In the middle region of this two-armed lever 23 is the pivot point 26 fixed to the housing, around which point the lever 23 swings. When the front edge of the table 21 is pressed down, these transfer members cause a relative motion of the base 19 and of the yoke which effects a lowering of the yoke onto the heating element. By the pressure on the front edge of the table 21 the yoke is firmly pressed with its bar against the strip-shaped heating element, so that thermoplastic synthetic foil materials are welded under pressure by means of the heating element.

Deviating from the embodiment example shown in the drawing, it is also possible to use in place of the base strip 17, a pan-shaped part which accommodates the table 12 and possibly also the container 18 and is provided with a border, under which the table is placed in box-fashion when its long side opposite the container is pushed down. Beyond this, it is also possible within the scope of the design described to have spring elements acting as a power accummulator to engage the yoke 14 and/or the transmission members directly instead of the base strip 17.

There are claimed:

1. Device for heat-sealing or cutting thin foil of synthetic material between two dies which are linked to each other and can be pressed together against a restoring force comprising:

(a) a table-like support having a recess in the underside of said support parallel to the front edge of the support, (b) a spring disposed in said recess, (c) a base strip movable in and out of said recess, said strip movable into said recess upon the application of pressure to press said two dies together, and said strip movable out of said recess upon the release of said pressure by said spring as said restoring force, (d) said table-like support having a pivotable edge on the underside of said support parallel to and to the rear of said base strip to permit said support to pivot on said edge when said base strip is moved into said recess, (e) one die fixed to the top surface of said table-like support, (f) another die disposed above said fixed die movable to press against said fixed die, said movable die having the form of a U-shaped yoke with the legs of the yoke fixedly attached to the yoke and movable therewith, (g) transmission members comprising two-armed levers which are hinged at one end at the sides of the base strip and at the legs of the U-shaped yoke at the other end, and the levers at an intermediate point between the points of hinging are pivotally fixed to said support, whereby pressing down on the front of said support causes the base strip to move into the recess making the two-armed levers pivot around said intermediate point thereby effecting lowering of the yoke.

2. Device according to claim 1, wherein the support is in the form of a rectangular table with the base strip extending along one of the long edges of the rectangular table, and with a drum-like container which accommodates a supply roll of the plastic foil extending along the long side of the rectangular table opposite the base strip.

3. Device according to claim 2, wherein the drum-like container and the base strip project beyond the underside of the support surface by at least the same distance, under the condition of no pressure exerted on the support surface.

4. Device according to claim 1, wherein the legs of the U-shaped yoke are guided substantially perpendicularly to the top surface of the support in guide ways on the sides of the support.

* * * * *